United States Patent [19]

Vandenhoeck

[11] 4,241,606
[45] Dec. 30, 1980

[54] PARTICULATE LEVEL MEASURING METHOD AND APPARATUS

[76] Inventor: Jean-Paul Vandenhoeck, 3 Shell Beach Rd., Guilford, Conn. 06437

[21] Appl. No.: 38,539

[22] Filed: May 14, 1979

[51] Int. Cl.³ .............................................. G01F 23/14
[52] U.S. Cl. ...................................... 73/290 R; 73/37
[58] Field of Search ............................... 73/290 R, 37

[56] References Cited

U.S. PATENT DOCUMENTS

| | | | |
|---|---|---|---|
| 3,213,670 | 10/1965 | MacGeorge | 73/290 R X |
| 3,290,938 | 12/1966 | Miller | 73/290 R |
| 3,459,035 | 8/1969 | Russon | 73/290 R X |
| 3,734,313 | 5/1973 | Gauthier et al. | 73/290 R X |
| 3,971,254 | 7/1976 | Sherman | 73/290 R |
| 3,979,958 | 9/1976 | Janssen et al. | 73/290 R |
| 3,994,169 | 11/1976 | Wolford | 73/290 R |

*Primary Examiner*—Gerald Goldberg
*Assistant Examiner*—Joseph W. Roskos
*Attorney, Agent, or Firm*—Lerner, David, Littenberg & Samuel

[57] ABSTRACT

Apparatus for measuring the level of particulate material in a container is disclosed including level indication conduit vertically disposed in a container so that changes in the level of the particulate material in the container result in corresponding changes in the level of particulate material in the level indication conduit, further conduits for flowing a gaseous stream through the level indication conduit and a pressure gauge for measuring the pressure drop in the gaseous stream flowing through the level indication conduit so that changes in the level of the particulate material in the level indication conduit causes corresponding changes in that pressure drop.

Methods for measuring the level of particulate materials in a container are also disclosed, including vertically disposing a level indication conduit in a container so that the level of the particulate material in the container is reflected in the level indication conduit, flowing a gaseous stream through the level indication conduit, and measuring the pressure drop in the gaseous stream flowing therethrough.

16 Claims, 1 Drawing Figure

U.S. Patent
Dec. 30, 1980
4,241,606
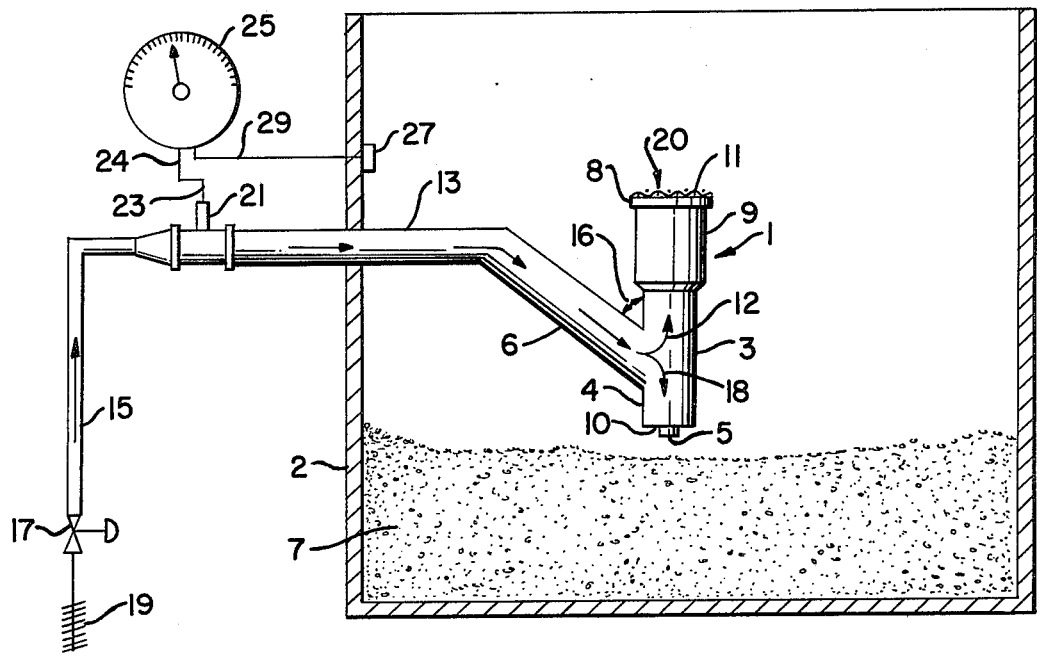

PARTICULATE LEVEL MEASURING METHOD AND APPARATUS

FIELD OF THE INVENTION

The present invention relates to apparatus and methods for measuring the level of particulate material in containers. Still more particularly, the present invention relates to pneumatic apparatus and methods for so measuring the level of particulate material in such containers.

BACKGROUND OF THE INVENTION

There has always been a need to accurately and automatically measure the level of particulate or other bulk materials such as sand while they are being maintained in various bins or containers. This is desirable not only to know precisely to what degree the container is filled, but furthermore so that appropriate actions, such as refilling or terminating the filling of the container, can be taken where necessary.

It was determined at quite an early stage that merely calculating the amount of material added or substracted from a container was highly inadequate and imprecise in determining such levels. Thus, the use of various sensors, whether electrical, pneumatic, or otherwise, was developed so that a more precise reading of the level of such materials could be determined within such containers, whether they are open or closed containers.

As an example, U.S. Pat. No. 3,734,313 to Gauthier et al, assigned to Donald Engineering Company, Inc., discloses a level indicator which includes a pair of tubes coupled to a source of pressurized gas, as can be seen in FIG. 1 thereof. The two tubes, including an upper tube and a lower tube, are J-shaped, and each includes an air gap 27 between its upwardly directed exit nozzle and an input tube 28 thereabove. Thus, when the particulate material in the container reaches either of the two levels at which the specific air gaps are located it fills that gap and prevents the air from flowing therebetween, thus increasing the pressure drop therein. Such a device, however, is not only quite complex, but also only provides information as to specific levels, i.e., one in connection with each such device, and a constant indication of the precise level in the container cannot be effected with such a device.

Other devices employ collapsible diaphragms mounted within the containers or storage bins which are collapsed by the weight of the particulate material at a given location so as to provide a level indication therein. These include U.S. Pat. No. 3,994,169 to Wolford, which discloses such a device having an elongated sensor or diaphragm member running the length of the container so that the displacement of air within the diaphragm can be measured whenever it is desired to determine the level of material therein. Again, aside from the question of the accuracy of this device continuous measurements are not obtained therewith. Similarly, U.S. Pat. No. 3,290,938 to Miller also discloses a device which includes a diaphragm or tube 16 also disposed within a container, so that as material is included in the container more of the tube collapses against the pressure of the particulate material, thereby in turn displacing air from the diaphragm into a bellows which can be read directly on indicator 38. This device again does not provide the type of accuracy which is desired in many instances.

Another type of measuring device is shown in U.S. Pat. Nos. 3,213,670 to MacGeorge and 3,459,035 to Russon. In each of these patents a single sensor is disposed above the level of material in the container to project a gaseous stream such as air against the upper level of the material and to thereby sense the air pressure reflected back to the sensor. In the device shown in the 3,213,670 patent, it is thus necessary to continuously adjust the level of the probe above the liquid level to maintain it at a predetermined distance thereabove, and in the 3,459,035 patent the probe 10 maintains its position, and the probe is actuated only when the level of material in the container reaches a desired level adjacent its end.

Finally, a number of additional such devices include a plurality of pressure sensors mounted at different heights in a storage chamber or bin for such measuring purposes. These include U.S. Pat. No. 2,696,606 to De La Pomelie, assigned to Gaz de France Service National, and U.S. Pat. No. 3,971,254 to Sherman, assigned to Kamyr, Inc.

The search has therefore continued for such a pressure measurement device which is simple in construction, and which can continuously monitor the precise level of material within a container or bin.

SUMMARY OF THE INVENTION

In accordance with the present invention it has now been discovered that this can be accomplished by employing an apparatus which includes a level indication means vertically disposed in the container in question so that changes in the level of particulate material in the container result in corresponding changes in the level of the particulate material in the level indication means, means for flowing a gaseous stream through the level indication means, and pressure measurement means for measuring the pressure drop in the gaseous stream flowing through the level indication means so that changes in the level of the particulate material in the level indication means causes corresponding changes in the pressure drop being measured. In particular, it is possible with this apparatus to accurately measure the actual level of particulate material in the container, since this apparatus can differentiate between that level and any fluidized particles above that level of particulate material in the container.

In one embodiment of the present invention, the level indication means includes a lower opening and an upper opening vertically displaced above the lower opening, with the lower opening preferably located at the lower end of the level indication means and the upper opening being located at the upper end of the level indication means.

In a preferred embodiment of the present invention the means for flowing a gaseous stream through the level indication means includes flow directing means for flowing that gaseous stream into a point in the level indication means which is in proximity to the lower opening, so that at least a part of the gaseous stream flows through the lower opening when that lower opening is not filled with the particulate material.

In another preferred embodiment of the present invention the lower opening is substantially smaller than the upper opening, so that even when the level of particulate material in the container is below that of the lower opening in the level indication means a pressure drop is still created and can act as a base point for measurement purposes.

In another embodiment of the present invention the pressure measuring means includes means for measuring the internal pressure within the container and the apparatus includes means for comparing that internal pressure with the pressure drop measured in the gaseous stream.

In a preferred embodiment of the apparatus of this invention the flow directing means is adapted to direct the gaseous stream into the level indication means at an angle of between about 15° and 75°, and particularly at about 45°, with respect to the vertical, and the stream is directed downwardly with respect to the horizontal axis thereof.

Further in accordance with the present invention, a method for measuring the level of particulate material in a container has also been discovered which includes vertically disposing a level indication means in the container so that changes in the level of the particulate material therein results in corresponding changes in the level of the particulate material in the level indication means, flowing a gaseous stream through the level indication means and measuring the pressure drop in the gaseous stream flowing through the pressure indication means so that changes in the level of the particulate material in the level indication means causes corresponding changes in that pressure drop.

In a preferred embodiment of the method of the present invention the gaseous stream flows upwardly through the level indication means, which includes a lower opening and an upper opening. Again, it is most preferred that the lower opening be substantially smaller than the upper opening, and that the gaseous stream flow into the level indication means at a point in proximity to the lower opening thereof.

In another embodiment of the method of the present invention, the particulate material has a predetermined average particle size, and the method includes preventing materials having a particle size substantially greater than that average particle size from entering the upper opening of the level indication means.

In another embodiment of the method of the present invention the internal pressure in the container is measured and compared to the pressure drop measured therewith.

BRIEF DESCRIPTION OF THE DRAWING

The drawing is a schematic representation of the level measuring apparatus of the present invention used in conjunction with a container.

DETAILED DESCRIPTION

The present invention will be more fully understood with reference to the drawing hereof. In the drawing there is shown a container or storage bin 2 which is intended to hold varying amounts of particulate material 7 such as sand, or other such materials, such as for example cement, flour, grain, carbon black, etc. It is intended that the particulate material 7 utilized will be continuously added to and/or removed from the storage container 2 by various conventional means.

The level measuring device 1 of this invention includes a vertically disposed conduit portion 3 maintained at a given location within the storage bin 2. It does not necessarily have to be disposed at the center of the storage bin, but can be at any location therein, and the length of this conduit can vary, again depending upon the size of the bin in question and the extent to which continuous measurement is desired therein.

In any event, means are provided for supplying a gas stream through the conduit or level indication means 3. The level indication means 3 includes an opening 5 at its lower end and is open at its upper end 20. The opening 5 at its lower end is considerably restricted, and can include a fitting 10 disposed at that lower end 4 of the conduit 3. The upper end 20 of the conduit 3 is substantially open, except as discussed below. Therefore, the opening 5 is substantially smaller than the opening 20, and for example in a conduit which has a 1¼ inch diameter, the opening 5 will be ⅜ inches.

The top portion 9 of the vertical conduit 3 includes a screen member 11 disposed on flange 8 at the upper end thereof. While the screen member does not block opening 20 nor prevent the flow of gas therethrough, it does prevent other foreign material of larger diameter from entering the conduit from the top and possibly plugging opening 5 at the bottom thereof.

A flow of gas such as a pressurized air stream is provided in the conduit through conduit sections 6 and 13. The flow of the air stream is shown by the arrows, and as can thus be seen the gaseous stream enters the vertical conduit portion 3 at its lower end 4 as shown in the drawing. Thus, when the opening 5 is unobstructed at least a portion of the gas stream will flow in the manner shown by arrow 18 downwardly and out through opening 5 therein. On the other hand, when the level of particulate material 7 in container 2 rises above the lower end of conduit 3, thus blocking opening 5, substantially the entire air stream will flow upwardly as shown by arrow 12 towards the opening 20 at the upper end 9 of conduit 3. As discussed above, this will not occur, however, until the actual level of particulate material renders opening 5, which will not be blocked by fluidized particulate material above that actual level. Such fluidized particles would likely be present when the particulate material is being constantly disturbed, such as when the container is being continuously filled when emptied.

The air stream itself is provided from a source of pressurized gas such as air in line 19 which is fed through line 15 into conduit 13, and which can be regulated by valve 17 in line 15.

The pressure drop of the flowing air stream is measured in conduit 13 by means of pressure gauge 25. This can be any type of conventional pressure measuring device, such as an electronic pressure gauge or other pressure sensitive device, which provides either a visual pressure indication or an electrical or pneumatic signal which is proportionate to the pressure being measured. The pressure gauge 25 is connected to the conduit 13 by conventional apparatus such as fitting 21 and pressure lines 23 and 24. In addition, a pressure sensor 27 is disposed within container 2 and the atmospheric pressure within the container is measured thereby, through pressure line 29, also by pressure gauge 25. Thus, the relative pressure drops of the flowing air stream can be accurately measured by pressure gauge 25.

It is preferred that the lower conduit portion 6 directing the air stream into the lower portion of the vertically disposed conduit 3 be maintained at an angle 16 with respect to the vertical of between about 15° and 75°, and preferably about 45° so as to direct the air stream towards the lower portion of the conduit 3 and opening 5 therein, while still rendering it possible for the air stream to turn upwardly within the conduit 3 when opening 5 is obstructed without creating substantial pressure drops in the gas stream. Furthermore, the angle 16 must be sufficient to prevent sand from backing up into the conduit 6.

In actual operation a source of pressurized gas or air is provided through lines 19 and 15 to eventually enter conduits 13 and 6 and be directed into vertically disposed conduit 3. When the level of sand or other particulate material in the container 2 is below the level at which the measuring device 1 is disposed, and opening 5 at the lower end 4 of conduit portion 3 is therefore unobstructed, the gas stream can flow downwardly as shown by arrow 18, through opening 5, and the pressure drop measured in line 13 by sensor 21 will read essentially 0. This reading will also take into consideration the normal pressure in container 2 as measured by sensor 27. As, however, the level of sand increases in container 2 at some point it will reach the bottom of vertical conduit 3 and obstruct opening 5 therein. At this point the stream of gas travel upwardly as shown by arrow 12 through opening 20 at the top of conduit 3 and a slight pressure drop is measured in terms of resistance to the flow of air therein.

As the level of sand increases further within the container 2 more sand enters the conduit 3 through opening 5. This additional sand entering the conduit, however, becomes fluidized by the stream of air therein which attempts to eject the sand from its path upwardly. This causes a corresponding increase in the pressure drop or resistance to the forward movement of the air stream within the conduit 3 and consequent increases in the pressure measurement in gauge 25. Such measurements will increase until the level of sand in the container 2 reaches the point where the entire conduit 3 is filled with that material, and the pressure drop will reach a maximum point which is equal to the resistance of the air flow through a packed bed of sand.

There is thus provided a method and apparatus for sensing the level of particulate material in a storage bin or container which is quite sensitive to changes in the level of particulate material, and which continuously measures that level as it changes therein.

It will be understood that the present invention is susceptible to modifications in order to adapt it to different environments, and it is understood that one skilled in the art will appreciate that such modifications can be made while remaining within the scope of the present invention as defined by the claims appended hereto.

What is claimed is:

1. Apparatus for continuously measuring the level of particulate material in a container comprising level indication means vertically disposed in said container, said level indication means comprising a conduit having a first end and a second end, said first and second ends including apertures, said first end being vertically disposed above said second end therein such that changes in said level of said particulate material between said first and second ends of said conduit in said container results in corresponding changes in the level of said particulate material in said conduit, means for flowing a gaseous stream through said conduit, and pressure measurement means for measuring the pressure drop in said gaseous stream flowing through said conduit whereby changes in said level of said particulate material between said first and second ends of said conduit causes corresponding changes in said pressure drop, whereby said level of said particulate material between said first and second ends of said conduit can be continuously monitored.

2. The apparatus of claim 1 wherein said means for flowing said gaseous stream through said conduit includes flow directing means for flowing said gaseous stream into a point in said conduit in proximity to said second end of said conduit so that at least part of said gaseous stream flows through said aperture in said second end of said conduit when said second end is not filled with said particulate material.

3. The apparatus of claim 2 wherein said aperture at said second end of said conduit is substantially smaller than said aperture at said first end of said conduit.

4. The apparatus of claim 2 wherein said flow directing means is adapted to direct said gaseous stream into said level indication means at an angle of between about 15° and 75° with respect to the vertical.

5. The apparatus of claim 1 wherein said pressure measuring means includes means for measuring the internal pressure within said container, and including means for comparing said internal pressure within said container with said pressure drop measured in said gaseous stream.

6. The apparatus of claim 1 including screen means covering said aperture at said first end of said conduit.

7. The apparatus of claim 1 wherein said means for flowing a gaseous stream through said conduit includes a source of pressurized air.

8. A method for continuously measuring the level of particulate material in a container comprising vertically disposing a level indication means comprising a conduit including a first end and a second end, in said container, said first and second ends of said conduit including apertures, said first end being disposed above said second end of said conduit such that changes in the level of said particulate material between said first and second ends of said conduit in said container result in corresponding changes in the level of said particulate material in said conduit, flowing a gaseous stream through said conduit, and measuring the pressure drop in said gaseous stream flowing through said conduit whereby changes in said level of said particulate material between said first and second ends of said conduit causes corresponding changes in said pressure drop, whereby said level of said particulate material between said first and second ends of said conduit may be continuously monitored.

9. The method of claim 8 including measuring the internal pressure in said container and comparing said internal pressure in said container to said pressure drop.

10. The method of claim 8 wherein said aperture at said second end of said conduit is substantially smaller than said aperture at said first end of said conduit.

11. The method of claim 8 wherein said particulate material has an average particle size, and including preventing materials having a particle size substantially greater than said average particle size from entering said aperture at said first end of said conduit.

12. The method of claim 8 wherein said gaseous stream enters said level indication means at an angle of between about 15° and 75° with respect to the vertical.

13. Apparatus for measuring the level of particulate material in a container comprising level indication means vertically disposed in said container such that changes in said level of said particulate material in said container results in corresponding changes in the level of said particulate material in said level indication means, means for flowing a gaseous stream through said level indication means, pressure measurement means for measuring the pressure drop in said gaseous stream flowing through said level indication means whereby changes in said level of said particulate material in said level indication means causes corresponding changes in said pressure drop, wherein said pressure measurement means further includes means for measuring the internal pressure within said container, and including means for comparing said internal pressure within said container with said pressure drop measured in said gaseous stream.

14. Apparatus for measuring the level of particulate material in a container comprising level indication means vertically disposed in said container such that changes in said level of said particulate material in said container results in corresponding changes in the level of said particulate material in siad level indication means, means for flowing a gaseous stream through said level indication means including flow directing means for flowing said gaseous stream into a point in said level indication means in proximity to said second end of said level indication means so that at least part of said gaseous stream flows through said aperture in said second end of said level indication means when said second end is not filled with said particulate material, said flow directing means being adapted to direct said gaseous stream into said level indication means at an angle of between about 15° and 75° with respect to the vertical, and pressure measurement means for measuring the pressure drop in said gaseous stream flowing through said level indication means whereby changes in said level of said particulate material in said level indication means causes corresponding changes in said pressure drop.

15. A method for measuring the level of particulate material in a container comprising vertically disposing a level indication means in said container such that changes in the level of said particulate material in said container result in corresponding changes in the level of said particulate material in said level indication means, flowing a gaseous stream through said level indication means, measuring the pressure drop in said gaseous stream flowing through said level indication means whereby changes in said level of said particulate material in said level indication means causes corresponding changes in said pressure drop and measuring the internal pressure in said container and comparing said internal pressure in said container to said pressure drop.

16. A method for measuring the level of particulate material in a container comprising vertically disposing a level indication means in said container such that changes in the level of said particulate material in said container result in corresponding changes in the level of said particulate material in said level indication means, flowing a gaseous stream through said level indication means, said gaseous stream entering said level indication means at an angle of between about 15° and 75° with respect to the vertical, and measuring the pressure drop in said gaseous stream flowing through said level indication means whereby changes in said level of said particulate material in said level indication means causes corresponding changes in said pressure drop.

* * * * *